United States Patent [19]
Nakabayashi et al.

[11] Patent Number: 4,576,995
[45] Date of Patent: Mar. 18, 1986

[54] LAMINATED ARTICLE AND PRODUCTION THEREOF

[75] Inventors: Masamitsu Nakabayashi, Sennan; Yuzo Furukawa, Kawanishi; Akira Tashiro, Takatsuki, all of Japan

[73] Assignee: Takeda Chemical Industries, Inc., Osaka, Japan

[21] Appl. No.: 633,426

[22] Filed: Jul. 19, 1984

[30] Foreign Application Priority Data

Jul. 22, 1983 [JP] Japan ................................. 58-134649

[51] Int. Cl.$^4$ ............................................ C08F 263/04
[52] U.S. Cl. .................................... 525/285; 428/215; 525/301
[58] Field of Search ................................ 525/285, 301

[56] References Cited

U.S. PATENT DOCUMENTS 3,950,209  4/1976  Kosaka ................................ 525/301
4,102,946  7/1978  Imura .................................. 525/301
4,157,362  6/1979  Morishita ............................ 525/301

FOREIGN PATENT DOCUMENTS 54-46281  4/1979  Japan .
56-4577   1/1981  Japan .

Primary Examiner—Paul R. Michl
Attorney, Agent, or Firm—Wenderoth, Lind & Ponack

[57] ABSTRACT

Disclosed is an adhesive for bonding an ethylene/vinyl alcohol copolymer and polystyrene, which comprises a modified ethylene/vinyl acetate copolymer obtained by graft-copolymerizing a styrenic vinyl monomer and an $\alpha,\beta$-unsaturated carboxylic acid to an ethylene/vinyl acetate copolymer. A laminated article having the said adhesive as an interlayer and production thereof are also disclosed. The laminated article shows strong resistance to delamination and excels in processability. Therefore, the laminate is valuable as a deep-draw forming material with enhanced gas barrier properties for a preservation rigid container for foods.

5 Claims, No Drawings

LAMINATED ARTICLE AND PRODUCTION THEREOF

The present invention relates to an adhesive exhibiting excellent adhesion to an ethylene/vinyl alcohol copolymer and polystyrene, to a laminated article having the adhesive as an interlayer and to the production thereof.

Ethylene/vinyl alcohol copolymers, owing to their excellent clarity and gas barrier properties toward water, vapor, oxygen, etc., have been widely used as packaging materials in such areas as foods, pharmaceuticals and cosmetics in the form of their laminates with a polyolefin such as polyethylene or polypropylene. In molding the laminates through a deep-draw process into a container for frozen foods, etc., there have been encountered processability problems such as lack of clarity, appearance of wrinkles on the bottom of the container and appearance of curls at the sealed portions. On the other hand, their laminates with polystyrene are suitable as a deep drawing material, but there has not been found out any adhesive which exhibits satisfactory performance in the production of the laminates.

As the adhesive for bonding ethylene/vinyl alcohol copolymers and polyolefins together, various adhesives have been put into practical use. These adhesives include, for example, modified polyolefins (e.g., polyethylene, polypropylene, an ethylene/vinyl acetate copolymer with a higher content of ethylene) which are subjected to graft-modification with an unsaturated carboxylic acid or its anhydride; copolymers from ethylene and an unsaturated carboxylic acid or ionomer resins obtained by crosslinking the copolymers with metal ions; ethylenic copolymers having glycidyl groups; and hydrolysis products of an ethylene/vinyl acetate copolymer. However, when these adhesives are applied to the bonding of ethylene/vinyl alcohol copolymer materials and polystyrene materials, they merely show poor adhesion performance, and there remain problems to be solved in their practical use. Because of this, it is of urgent necessity to develop an adhesive useful for bonding ethylene/vinyl alcohol copolymers and polystyrene together.

The present inventors, after their intensive study on such adhesives, found that such modified ethylene/vinyl acetate copolymers as obtained by graft-copolymerizing styrene and maleic anhydride to ethylene/vinyl acetate copolymers exhibit excellent performance in bonding ethylene/vinyl alcohol copolymers and polystyrene. The present invention has been completed based on the finding and further study.

Thus, the present invention is concerned with;

(1) An adhesive for bonding an ethylene/vinyl alcohol copolymer and polystyrene together, which comprises a modified ethylene/vinyl acetate copolymer obtained by graft-copolymerizing a styrenic vinyl monomer and an $\alpha,\beta$-unsaturated carboxylic acid to an ethylene/vinyl acetate copolymer, (2) A laminated article which consists of an ethylene/vinyl alcohol copolymer and polystyrene and has a modified ethylene/vinyl acetate copolyemr obtained by graft-copolymerizing a styrenic vinyl monomer and an $\alpha,\beta$-unsaturated carboxylic acid to an ethylene/vinyl acetate copolymer as its adhesive interlayer, and (3) A process for producing a laminated article which comprises (a) forming an ethylene/vinyl alcohol copolymer material and polystyrene material into a sheet, respectively and sandwiching between the sheets an adhesive which comprises a modified ethylene/vinyl acetate copolymer obtained by graft-copolymerizing a styrenic vinyl monomer and an $\alpha,\beta$-unsaturated carboxylic acid to an ethylene/vinyl acetate copolymer, followed by hot-pressing, or (b) coextruding an ethylene/vinyl alcohol copolymer material and polystylene material together with an adhesive which comprises a modified ethylene/vinyl acetate copolymer obtained by graft-copolymerizing a styrenic vinyl monomer and an $\alpha,\beta$-unsaturated carboxylic acid to an ethylene/vinyl acetate copolymer.

Described below are the modified ethylene/vinyl acetate copolymers usable in the present invention and the process for producing the same. A base polymer for the modified products is an ethylene/vinyl acetate copolymer which is the known copolymer. The copolymer can be produced, for example, by the high-pressure polymerization in which ethylene and vinyl acetate are polymerized at 1000 to 2000 atmospheric pressure or by the solution or emulsion polymerization, the polymerizations being carried out in the presence of an organic solvent as a medium at 300 to 400 atmospheric pressure. In the present invention, use can be made of a copolymer containing 1 to 50 weight %, preferably 10 to 45 weight %, of vinyl acetate and showing a melt index of 0.1 to 500 g/10 min, preferably 0.5 to 30 g/10 min. The component for the adhesive according to the present invention is a modified product produced by graft-copolymerizing a styrenic vinyl monomer and an $\alpha,\beta$-unsaturated carboxylic acid to the copolymer.

As the styrenic vinyl monomer, mention can be made of, for example, styrene, p-methylstyrene, $\alpha$-methylstyrene, etc., and particularly styrene is preferably used. As the $\alpha,\beta$-unsaturated carboxylic acid, mention can be made of, for example, an acrylic vinyl monomer such as acrylic acid and methacrylic acid or an $\alpha,\beta$-unsaturated dicarboxylic acid or anhydride thereof such as maleic acid, maleic anhydride, fumaric acid, itaconic acid and itaconic anhydride, and particularly maleic anhydride is preferably employed.

The amount of the $\alpha,\beta$-unsaturated carboxylic acid to be used is such that the ratio of the $\alpha,\beta$-unsaturated carboxylic acid to a modified copolymer obtained by graft-copolymerizing the styrenic vinyl monomer and the $\alpha,\beta$-unsaturated carboxylic acid may be 0.05 to 10 weight %, preferably 0.5 to 5 weight %, and the styrenic vinyl monomer is employed in the proportion of about 0.8 to 1.2 moles per mole of the $\alpha,\beta$-unsaturated carboxylic acid. It is undesirable to employ the $\alpha,\beta$-unsaturated carboxylic acid in the amounts which fall out of the above-specified range, because in the ratio of less than 0.05 weight % are obtained modified products with poor adhesion toward ethylene/vinyl alcohol copolymers and in the ratio of more than 10 weight % are obtained modified products with remarkably high melt viscosity, inviting difficulties in handling, and, in addition to this, the obtained modified products have high polarity, resulting in decreased adhesion toward polystyrene.

In order to graft-copolymerize the styrenic vinyl monomer and the $\alpha,\beta$-unsaturated carboxylic acid to an ethylene/vinyl acetate copolymer, the conventional graft polymerization technique can be employed and the graft-polymerization is carried out in the presence of a radical polymerization initiator. As the radical polymerization initiator, there may be mentioned dialkyl organic peroxides, such as dialkyl peroxides exemplified by dicumyl peroxide, di-t-butyl peroxide, etc., peroxy esters exemplified by t-butyl peroxybenzoate, t-butyl peroxyoctoate, t-butyl peroxyacetate, t-butyl peroxyisobutyrate, t-butyl peroxypivalate, etc. and diacyl peroxides exemplified by lauroyl peroxide, benzoyl peroxide, acetyl peroxide, etc.; and azo compounds such as azobisisobutyronitrile, and it is preferable to use organic peroxides such as diacyl peroxides. The radical initiator is employed at the ratio of about 0.1 to 10 weight % againt the ethylene/vinyl acetate copolymer. Furthermore, it is desirable to conduct the polymerization at a temperature in the range from ambient temperature to 150° C. The polymerization can be achieved by employing a solution, suspension, emulsion or bulk polymerization method. In carrying out the solution polymerization, employable as the solvent are aromatic hydrocarbons such as benzene, toluene and xylene, aliphatic hydrocarbons such as kerosene, hexane and petroleum ether, and chlorinated hydrocarbons such as 1,2-dichloroethane. The amount of the solvent is generally from ½ to 5 times by weight that of the base copolymer. After the polymerization, a non-solvent is added to the reaction solution in an amount of ½ to 3, preferably 0.9 to 1.3 times the solvent volume used. The non-solvent includes a monohydric alcohol such as methanol and ethanol. The precipitates are gathered to obtain a modified ethylene/vinyl acetate copolymer product.

The adhesive according to the present invention comprises the modified ethylene/vinyl acetate copolymer product obtained by the above procedure. The modified product may contain, in addition to the graft copolymer formed by alternate copolymerization of the styrenic vinyl monomer and the $\alpha,\beta$-unsaturated carboxylic acid to a base resin of an ethylene/vinyl acetate copolymer, a copolymer produced by copolymerization of the styrenic vinyl monomer and the $\alpha,\beta$-unsaturated carboxylic acid and furthermore an ethylene/vinyl acetate copolymer which does not undergo graft modification.

The adhesive of the present invention may be in the form of pellet, granule, powder, film or sheet. The adhesive can contain antioxidants, light stabilizers, heat stabilizers, antistatic agents, fillers, antiblocking agents, etc., in addition to the said product, within such limits as may not impair the object of the present invention.

The adhesive of the present invention displays excellent bonding strength when applied to bond an ethylene/vinyl alcohol copolymer and polystyrene together, and laminated articles of ethylene/vinyl alcohol copolymer and polystyrene bonded with the adhesive of the present invention, for example, three-layer laminates consisting of an ethylene/vinyl alcohol copolymer and polystyrene and having the adhesive of the present invention as an interlayer, not only show strong resistance to delamination but also excel in processability, therefore being of value as a deep-draw forming material with enhanced gas barrier properties and utilizable as a preservation rigid container for foods, especially frozen foods.

The ethylene/vinyl alcohol copolymer, which is one substrate in the present invention, is commercially available polymer materials (e.g. Eval®E and Eval®F, manufactured by Kuraray Co., Ltd. Japan) which are obtainable by copolymerization of ethylene (5 to 50 mole %) and vinyl acetate (50 to 95 mole %), followed by saponification of the resultant polymers.

As the polystyrene which is another substrate, there may be mentioned commonly used styrene homopolymers; copolymers made by copolymerizing styrene as the principal component and other polymerizable vinyl monomers; and impact-resistant polystyrenes formed by incorporating a rubber component, and so forth. In order to bond these substrates together to produce laminated articles or laminates, use can be made of a process which comprises (a) forming an ethylene/vinyl alcohol copolymer material and polystyrene material into a sheet, respectively and sandwiching between the sheets an adhesive which comprises a modified ethylene/vinyl acetate copolymer obtained by graft-copolymerizing a styrenic vinyl monomer and an $\alpha,\beta$-unsaturated carboxylic acid to an ethylene/vinyl acetate copolymer, followed by hot-pressing, or (b) co-extruding an ethylene/vinyl aochol copolymer material and polystyrene material together with an adhesive which comprises a modified ethylene/vinyl acetate copolymer obtained by graft-copolymerizing a styrenic vinyl monomer and an $\alpha,\beta$-unsaturated carboxylic acid to an ethylene/vinyl acetate copolymer. In carrying out process (a), the adhesive is deposited on one of the sheets in the form of the film or melt-coated on the surface of one of the sheets, on which another sheet is put to prepare a sandwich with a middle layer of the adhesive. The sandwich is hot-pressed at 180°–230° C. to prepare a laminate. By employing the conventional co-extrusion technique, the ethylene/vinyl alcohol copolymer and polystyrene can be bonded together to one piece to obtain laminates, the interlayer of which is an adhesive of the present invention. In carrying out process (b), a co-extrusion die is used and the extrusion temperature of the polystyrene is about from 200° to 250° C., that of the ethylene/vinyl alcohol copolymer is from 200° to 230° C. and that of the modified ethylene/vinyl acetate copolymer is from 180° to 230° C. The laminate sheet obtained by the above procedures usually consists of the polystyrene layer with a thickness of 200 to 800$\mu$ and the ethylene/vinyl alcohol copolymer with a thickness of 10 to 200$\mu$ and has an adhesive interlayer of 10 to 200$\mu$. The adhesive of the present invention is particularly useful as a co-extrudable adhesive in the co-extrusion method.

Described below are the examples to illustrate the present invention more specifically.

EXAMPLE 1

Using a 20-1 Henschel mixer, the graft copolymerization of an ethylene/vinyl acetate copolymer was carried out in accordance with the formulation described below.

| | |
|---|---|
| Ethylene/vinyl acetate copolymer (a vinyl acetate content of 25 weight % and a melt index of 2.0 g/10 min) | 1500 g |
| Styrene | 54 g |
| Maleic anhydride | 39 g |
| Benzoyl peroxide | 6 g |
| Xylene | 4500 ml |

First, the ethylene/vinyl alcohol copolymer and xylene were charged into a Henschel mixer, and stirring was continued at 115° C. for 1 hour under a nitrogen atmosphere to dissolve completely the ethylene/vinyl acetate copolymer. Then, maleic anhydride and styrene were charged into the mixer, and after stirring for 10 minutes, a solution of a polymerization initiator in 100 ml of xylene was poured thereto, and the graft-copolymerization reaction was continued at 115° to 120° C. for 2 hours.

After the polymerization reaction, 5400 ml of methanol was poured into the reaction mixture, and the powdered material precipitated was recovered by filtration and dried to yield a modified ethylene/vinyl acetate copolymer having a melt index of 0.7 g/10 min. and containing 1.9 weight % of maleic anhydride.

To the modified product thus obtained was added tetrakis[methylene-3(3,5-di-t-butyl-4-hydroxyphenyl)-propionate]methane in an amount such as its content is 1000 ppm, and the mixture was melt-kneaded in an extruder and then pelletized.

Using the adhesive obtained by the above procedure, an ethylene/vinyl alcohol copolymer sheet (Eval ®F, produced by Kuraray Co., Ltd.; thickness of 150μ) and an impact-resistant polystyrene sheet (Styron ®470, produced by Asahi Dow Co.; thickness of 150μ) were laminated under a hot press of 200° C. to be 25μ in the bonding layer thickness to produce a laminate. T-type peeling-off testing to measure peeling-off strength revealed that the laminate had 3.5 kg/cm of peeling-off strength.

REFERENCE EXAMPLE 1

Using a 20-l Henschel mixer, the graft polymerization reaction was carried out in the same manner as in Example 1 in accordance with the formulation described below.

| Ethylene/vinyl acetate copolymer; (a vinyl acetate content of 25 weight % and a melt index of 2.0 g/10 min) | 1500 g |
|---|---|
| Maleic anhydrirde | 39 g |
| Benzoyl peroxide | 10 g |
| Xylene | 4500 ml |
| Polymerization temperature | 120° C. |
| Polymerization time | 8 hrs. |

There was obtained a graft copolymer having a melt index of 0.8 g/10 min. and containing 1.2 weight % of maleic anhydride. By following the same procedure as described in Example 1, the copolymer was formed into pellets, and with use of this pellet-formed adhesive, a laminate was fabricated. T-type peeling-off testing to measure peeling-off strength revealed that the laminate had 0.5 kg/cm of peeling-off strength.

EXAMPLES 2 TO 5

With various amounts of styrene and maleic anhydride as shown in Table 1, the same graft copolymerization reactions as mentioned in Example 1 were carried out to produce modified ethylene/vinyl acetate copolymers. Using the resultant adhesives, the laminates of ethylene/vinyl alcohol copolymer and impact-resistant polystyrene sheets were prepared, and their peeling-off strength was measured with the results as shown in Table 2.

TABLE 1

Synthesis conditions and compositions of graft copolymers.

| Example | Graft copolymerization reaction conditions | | | Modified product | |
|---|---|---|---|---|---|
| | Amount of styrene, g | Amount of maleic anhydride, g | Amount of benzoyl peroxide, g | Melt index (g/10 min) | Content of maleic anhydride (weight %) |
| 2 | 10.4 | 7.5 | 3 | 1.4 | 0.3 |
| 3 | 31 | 22 | 6 | 0.8 | 1.1 |
| 4 | 114 | 83 | 9 | 0.6 | 4.3 |
| 5 | 260 | 190 | 12 | 0.5 | 9.7 |

TABLE 2

| Testing of T-type peeling-off strength | |
|---|---|
| Example | Peeling-off strength (kg/cm) |
| 2 | 2.0 |
| 3 | 3.0 |
| 4 | 4.5 |
| 5 | 2.5 |

EXAMPLE 6

Following the same procedure as described in Example 1 except that they ethylene/vinyl acetate copolymer with a vinyl acetate content of 33 weight % and a melt index of 1 g/10 min. was used in Example 1 as ethylene/vinyl acetate copolymer, the graft copolymerization reaction was carried out to yield a modified ethylene/vinyl acetate copolymer with a melt index of 0.49 g/10 min. and maleic anhydride content of 20 weight %.

The modified copolymer was treated by the same procedure as described in Example 1 to produce a pellet-formed adhesive. By the same procedure as mentioned in Example 1, a laminate consisting of ethylene/vinyl alcohol copolymer and polystyrene sheets was prepared with use of the pellets as the adhesive layer. The laminate showed 3.7 kg/cm of T-type peeling-off strength as measured.

EXAMPLE 6

The resins (a), (b) and (c) were individually melted in an extruder and each of the melted resins was fed to a three-layer co-extrusion die and co-extruded. The extrusion temperature of the resin (a) was controlled to 210° C., that of the resin (b) was controlled to 210° C. and that of the resin (c) was controlled to 200° C.

Resin (a): ethylene/vinyl alcohol copolymer (Eval ®F; manufactured and marketed by Kuraray Co., Ltd.)

Resin (b): impact-resistant polystyrene (Styron ®470; manufactured and marketed by Ashai Dow Co., Ltd.)

Resin (c): modified ethylene/vinyl acetate copolymer as obtained in Example 1

The procedure gave a three-layer laminate sheet consisting of layer (a) with a thickness of 60μ/layer (c) with a thickness of 40μ/layer (b) with a thickness of 290μ. The laminate sheet obtained showed a 180° peeling strength of 2040 g/cm. By a vacuum draw forming technique, a cylindrical cup was made of the laminate at 130° C. and in a draw ratio of 1. The delamination was not observed and the cup obtained had a good appearance.

We claim:

1. An adhesive for bonding an ethylene/vinyl alcohol copolymer and polystyrene together, which comprises a modified ethylene/vinyl acetate copolymer obtained by graft-copolymerizing styrene and an α,β-unsaturated dicarboxylic acid or anhydride thereof to an ethylene/vinyl acetate copolymer.

2. An adhesive according to claim 1, wherein the base copolymer for the modification is an ethylene/vinyl acetate copolymer containing 1 to 50 weight % of vinyl acetate and showing a melt index of 0.1 to 500 g/10 min.

3. An adhesive according to claim 1, wherein the anhydride of the α,β-unsaturated dicarboxylic acid is maleic anhydride.

4. An adhesive according to claim 1, wherein the amount of the α,β-unsaturated dicarboxylic acid or anhydride thereof to be used is such that the ratio of the α,β-unsaturated dicarboxylic acid or anhydride thereof to a modified copolymer obtained by graft-copolymerizing the styrene and the α,β-unsaturated dicarboxylic acid or anhydride thereof to an ethylene/vinyl acetate copolymer is 0.05 to 10 weight %.

5. An adhesive according to claim 1, wherein styrene is employed in the proportion of about 0.8 to 1.2 moles per mole of the α,β-unsaturated dicarboxylic acid or anhydride thereof.

* * * * *